Patented June 7, 1949

2,472,616

UNITED STATES PATENT OFFICE 2,472,616

TREATMENT OF WATER

William George Prescott, Ewart Ingham Akeroyd, and Eric Leighton Holmes, London, England, assignors to The Permutit Company, New York, N. Y., a corporation of Delaware No Drawing. Application September 22, 1944, Serial No. 555,390. In Great Britain November 12, 1943

4 Claims. (Cl. 210—23)

This invention relates to improvements in the treatment of water by the addition of lime or lime and soda for the purpose of removing its hardness. In installations of this character the insoluble reaction products are generally removed by sedimentation or in certain more recently developed methods, such as disclosed in the Zentner Patent 2,259,717 and the Spaulding Patent 2,021,672 by accretion or crystallization onto small particles or granules of seed which are maintained in suspension in the water while the reactions take place. Ordinarily in installations of this type, the removal of precipitates from the water is so thorough that the water leaving the reaction or sedimentation zone has a turbidity of the order of about 10 parts per million. In some cases, however, some precipitates of a colloidal nature remain in suspension so that the water leaving the apparatus then has a considerably higher turbidity, up to 50 parts per million and more. While such high turbidity may be removed by subsequent filtration, this proves troublesome because the very fine suspended matter causes rapid clogging of the filters.

It is the object of this invention to provide a process wherein the addition of a small amount of a chemical to the water to be treated will substantially reduce the relatively high turbidity of the effluent encountered in the treatment of certain waters by the lime or lime soda process of said Patents Nos. 2,259,717 and 2,021,672.

We have found that in a plant in which water is treated according to these patents by the addition of lime or lime and soda and which yields a turbid effluent, the formation of exceedingly fine particles of precipitate and thus the turbidity of the effluent may be substantially reduced by adding a small quantity, of the order of 0.1 to 10 parts per million, of a compound which introduces $PO_4$ ions into solution. The exact quantity to be chosen depends not only on the type of $PO_4$ containing compound, but also to some extent on the composition of the water so that the amount to be fed for optimum results is best determined by tests in each case. The increase in $PO_4$ dosage beyond the small amounts required to produce the desired result should be avoided as there usually is a proportion which produces best results, and the turbidity of the effluent may increase when this optimum proportion is exceeded. The compound preferably is added to the water prior to addition of the lime or lime and soda, and does not otherwise affect the quality of the treated water.

One compound with which excellent results have been obtained is crystalline disodium hydrogen phosphate ($Na_2HPO_4.12H_2O$). The other orthophosphates can also be used.

An installation of the type disclosed in the Spaulding Patent 2,021,672 was used to treat water containing hardness predominantly in the form of bicarbonates. The particles in the sludge blanket in this apparatus were relatively small in size and the effluent water was quite turbid, containing between 20 and 30 parts per million of turbidity. Within 2 hours after the addition of crystalline disodium hydrogen phosphate in a proportion of 5 parts per million had been started, a remarkable improvement was noted. The top of the sludge blanket dropped noticeably, indicating the presence of larger particles in the blanket. At the same time the turbidity of the effluent decreased to between 5 and 10 parts per million. This low turbidity and lower sludge blanket level were maintained as long as the addition of phosphate was continued. Within a short time after the addition of the phosphate had been discontinued, the top of the sludge blanket gradually rose again and the turbidity of the effluent water reverted to what it originally had been, that is approximately 30 parts per million.

Having disclosed what we consider the preferred method of practicing our invention, we recognize that the same may be modified without departing from the spirit thereof, as for instance, by effecting the addition of $PO_4$ ions by passing a portion of the water through a bed of natural or artificial material containing $PO_4$ in soluble form. Reference is accordingly made to the appended claims for a definition of the scope of our invention.

What we claim is:

1. The process of softening water which comprises introducing 0.1 to 10 parts per million of $PO_4$ ions into solution in the water, adding sufficient chemicals from the group consisting of lime and soda to react with the calcium and magnesium hardness in said water, and then flowing said water upwardly through a mass of particles at a rate of flow high enough to maintain said mass in suspension whereby the presence of said $PO_4$ ions increases the amount of calcium carbonate which crystallizes from said water on said particles.

2. The process of softening water which comprises adding 0.1 to 10 parts per million of orthophosphate to the water to introduce $PO_4$ ions into solution, adding sufficient chemicals from the group consisting of lime and soda to react with the calcium and magnesium hardness in said water, and then flowing said water upwardly through a mass of particles at a rate of flow high enough to maintain said mass in suspension whereby the presence of said $PO_4$ ions increases the amount of calcium carbonate which crystallizes from said water on said particles.

3. In an accelerated lime-soda process of softening hard water in which the water after addition of the softening chemical is promptly flowed through small particles of seed material maintained in suspension to stimulate precipitation of the hardness constituents from the water, the improvement which consists of adding to the water before the addition of said softening chemical 0.1 to 10 ppm of a compound that introduces $PO_4$ ions into solution before the water is flowed through the particles in order to produce a more complete separation of the precipitated matter from the water.

4. In an accelerated lime-soda process of softening hard water in which the water after addition of the softening chemical is promptly flowed upwardly through a bed of granular insoluble contact material at a velocity to maintain this material in suspension and crystallize reaction products of the hardness constituents thereon, the step of reducing the turbidity of the effluent from said process by adding to the raw water before said softening chemical addition and upward flow 0.1 to 10 ppm of an orthophosphate.

WILLIAM GEORGE PRESCOTT.
EWART INGHAM AKEROYD.
ERIC LEIGHTON HOLMES.

REFERENCES CITED

The following references are of record in the file of this patent:

UNITED STATES PATENTS

| Number | Name | Date |
|---|---|---|
| 692,979 | Brueckner | Feb. 11, 1902 |
| 913,034 | McMurtrie | Feb. 23, 1909 |
| 1,002,603 | Payne | Sept. 5, 1911 |
| 1,693,066 | White | Nov. 27, 1928 |
| 1,823,605 | Hoover | Sept. 15, 1931 |
| 1,841,825 | Kriegsheim | Jan. 19, 1932 |
| 1,870,404 | Derr | Aug. 9, 1932 |
| 1,903,041 | Hall et al. | Mar. 28, 1933 |
| 1,924,861 | Judson | Aug. 29, 1933 |
| 2,004,694 | Gillet | June 11, 1935 |
| 2,021,672 | Spaulding | Nov. 19, 1935 |
| 2,044,583 | Rankin | June 16, 1936 |
| 2,142,515 | Joos | Jan. 3, 1939 |
| 2,259,717 | Zentner | Oct. 21, 1941 |
| 2,285,992 | Magill | June 9, 1942 |
| 2,301,429 | Magill | Nov. 10, 1942 |